Dec. 14, 1943.  F. EARLE  2,336,781
METHOD OF PROJECTING PICTURES
Filed Aug. 15, 1940

INVENTOR
Ferdinand Earle
BY
Riddle, Bithell and Montgomery
ATTORNEYS.

Patented Dec. 14, 1943

2,336,781

UNITED STATES PATENT OFFICE 2,336,781

METHOD OF PROJECTING PICTURES

Ferdinand Earle, New York, N. Y., assignor to Denise Loncin Earle, New York, N. Y.

Application August 15, 1940, Serial No. 352,701

9 Claims. (Cl. 88—16.4)

My invention relates to an improved process for the projection of pictures whereby improved effects from an artistic standpoint may be produced.

Another object of my invention is the projection of pictures by a process which is relatively simple and inexpensive in comparison with methods employed heretofore, and is applicable to objects without motion as well as to objects in motion and to pictures thereof.

It is understood that my invention is applicable to pictures in black and white as well as to color. The edges in these pictures are so graduated in light and shade with reference to black and white or tinted with respect to pictures in color that the illusion of change and motion is produced upon or through a projection surface or screen. Thus the illusion of bodily movement and/or change in size and/or appearance may readily be produced. This illusion is produced in a gradual and absolutely steady fashion as distinguished, for example, from the type of spectacle wherein the illusion of movement is produced, as in an animated cartoon, for instance, by photographing a great number of consecutive designs of an object, the drawings being identical, but displaced slightly with respect to each other. When the illusion of an increase or decrease in size was desired, it was necessary to make a great number of designs, each very slightly increasing or diminishing in size from the others and these were generally photographed frame by frame in continuity. By my improved method far smoother results are obtained and the number of drawings required may be only three or four as compared with possibly hundreds by present practice.

Respecting pictures to be projected in color: My invention involves the production of a series of pictures, each composed of a plurality of colors intended on projection to be superimposed— the colors of each picture bearing a certain definite relation to the colors of both the several preceding and several following pictures in respect to prismatic progression or prismatic inversion, or both, whereby, for example, projection creates illusions of gradual and unbroken changes in colors.

My invention also involves an unbroken sequence of precipitated lap dissolves of pictures having consecutive graduated edges, the pictures being projected so as to produce the illusion of movement and change.

In regard to the sequential lap dissolving of pictures with consecutive graduated edges, projected so as to produce the optical illusion of movement and changes even when there is no actual movement present and when the changes exist only in the deliberate modifications made in the succeeding pictures in lighting and shade and, if in color, in the prismatic orchestrations, so to speak, and assuming that it is desired, just by way of example, to employ my invention in the production of a motion picture film: For the sake of clarity and simplicity of description let it be assumed that the optical illusion of movement and change in a rectangular object is to be obtained. By present methods it would be necessary to make up a great number of drawings of the object, usually twenty-four for each second of motion picture projection, each advanced or retracted, as the case may be, with respect to the others, and to cine-photograph these drawings separately frame by frame. While great strides have been made in the industry in recent years, yet, at best, such methods from the artistic standpoint are still very crude and at the same time and by the same token are very expensive.

According to the present invention, to procure the illusion of movement with a rectangular object, only a few pictures, perhaps only two or three, are required to produce the complete illusion of a soft-edged object moving from one position to another, the object of each picture comprising a core and graduated edges. These pictures are photographed and projected in such a manner as to produce, superimposed, the necessary lap dissolves.

When motion picture photography is employed the result may be obtained in many well-known ways: By chemically faded "fade-in's and fade-out's," that are lapped in printing; or by plain "fades-in" and "fades-out" made in the camera and afterward lapped in the printer; or when a lap dissolve is desired, by superimposing two or more pictures on the same film, one picture being cine-photographed by starting with full exposure and gradually diminishing to zero exposure—the film then being brought back without further exposure to the starting point. A second picture is then photographed in the reverse order, to wit, starting from zero exposure at the point of beginning, exposure gradually increasing until full exposure is reached, at the point where the first picture completely vanished, and then immediately decreasing until the second picture vanishes. The film is then reversed to the point where the first picture vanished and where the second picture is fully exposed, and exposure made to a third picture beginning at zero exposure and gradually increasing until maximum exposure is reached at the point where the second picture vanished, and then immediately decreasing until the third picture completely vanishes. The film is then reversed to the point where the second picture vanished and the third picture was fully exposed, and exposure made to a fourth picture, beginning with zero exposure and gradually increasing until full exposure is reached at the point where the second picture vanished and the third picture was fully exposed. In other words, while the camera shutter is always started in closed position and always stopped in closed position, the film, as far as this invention is concerned, would generally be turned back to the point where the last dissolve reached its greatest intensity of exposure, it being permissible that the various laps may be of varying length, as long as the paired lap dissolves coincide in length and character, more or less.

In this same connection and to emphasize the saving I effect in the number of original pictures necessary to achieve the illusion of displacement of an object in one original picture with respect to the position of the object in the immediately preceding and the immediately following pictures—regardless of footage—the sense of displacement cannot exceed the width of the graduated edge when the latter is of less width than the core. On the other hand, when the graduated edge is of greater width than the core, the sense of displacement cannot exceed the width of the core. By the old method forty-eight drawings are supposed to be required for every yard or two seconds of film projected.

The same principle holds true with respect to producing the illusion of increase or decrease in the size of an object, whether used with colors in prismatic sequences or in black and white. The increase or decrease is obtained regardless of footage by the combination of graduated edges in conjunction with a chain of continuous lap dissolves.

In the accompanying drawing which is simply diagrammatic:

Figure 1:
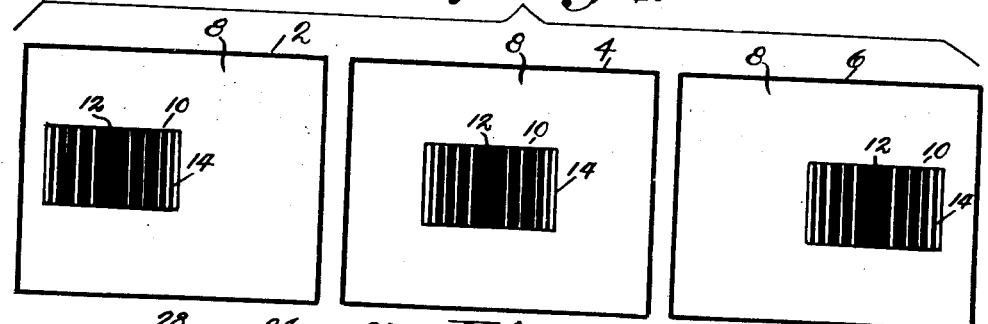
Fig. 1 illustrates pictures for producing, on projection, the illusion of linear motion.
Figure 4:
Fig. 4 illustrates diagrammatically the method employed in connection with actual projection, on the one hand, and the method of photographing when projection is made through a traveling film such as a motion picture film.

Referring first of all to Figs. 1 and 4: 2, 4 and 6 designate three pictures, each composed, just by way of example, of a white background 8 and the picture 10 of a rectangular stationary object, which on projection is to appear to move.

It will be noted that each picture 10 is composed of a core 12 and graduated edges 14. I have attempted so to illustrate these edges that the inner part of the edges gradually blend into the core while the periphery of the edges gradually blends into the background, which, as above noted, is white.

It is to be noted also that the object 10 in picture 4 is displaced laterally with respect to the object 10 in picture 2, and that the object 10 in picture 6 is displaced laterally with respect to the object 10 in picture 4. The displacement in picture 4 is not necessarily the same as that in picture 6, but, in any event, must not exceed the width of the core, provided, as I have illustrated, the core is narrower than the edge. On the other hand, if the core is wider than the edge, then the permissible displacement is limited by the width of the edge.

Should it be desired to project these pictures by way of lantern slides, for example, the light from one projector is passed through picture 2, the light gradually decreasing in intensity, and simultaneously light from the other projector is passed through picture 4, its intensity being varied in the opposite sense.

Thus with reference to Fig. 4 the light rays designated 16 are seen gradually to decrease in intensity, while the light rays 18 starting at 25 gradually increase in intensity in the same direction. The exposure to picture 4 is continued from point 20—maximum light intensity and where picture 2 completely vanished—and gradually decreased to zero at 22, while at point 24, minimum intensity of rays 16, the rays are gradually increased, this time passing through picture 6. This will produce the illusion of a gradual advance of the object 10 to the right, as I have illustrated it. It will be readily understood that the apparent motion may be in any direction, controlled by the direction of displacement of the pictures 10 with respect to each other.

In other words, I produce the illusion of motion by the lap dissolving of a series of pictures, the objects in which have graduated edges and are displaced with respect to each other in the direction of the desired motion.

The same illusion may be produced by photographing pictures 2, 4 and 6 upon a traveling film and then projecting in the usual way. In this connection, picture 2 is exposed to a traveling film in a camera starting at 25 with full open shutter and gradually diminishing to zero exposure at 24, Fig. 4. The film is then brought back to the starting point 25 and exposed to picture 4, this time starting with zero exposure and gradually increasing until full exposure is reached at point 20, which coincides in position with zero exposure 24. Exposure of picture 4 is continued with a gradual decrease in exposure until point 22, zero exposure, is reached. The film is then reversed with closed shutter until point 28 is reached, whereupon exposure is begun to picture 6, exposure gradually increasing to maximum at 26 corresponding to zero exposure of picture 4.

Upon projection of such a film in the usual way the illusion of motion is produced.

Figure 2:
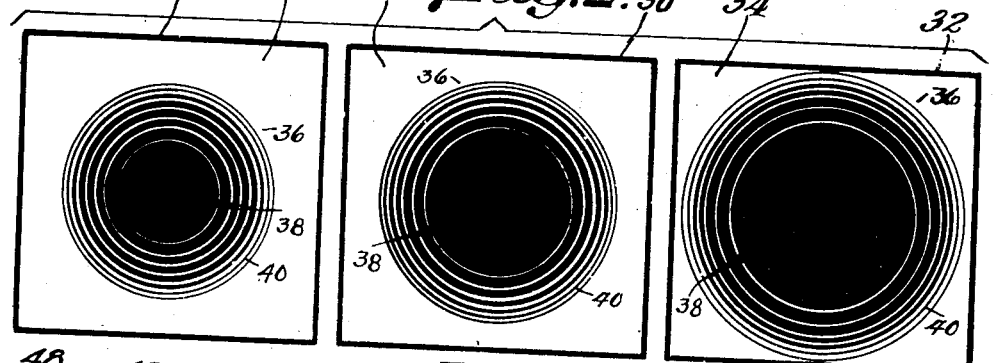
Fig. 2 illustrates pictures for producing, on projection, the illusion of change in size.

Referring now to Fig. 2: This figure relates to the illusion of change in size of an object. Again I show three pictures, designated 28, 30 and 32, respectively. Each picture is composed of background 34 and picture 36 of an object. Each picture 36 is composed of a core 38 and graduated edge 40. The inner part of the edges blends into the core and the periphery into the background which, for purposes of illustration, is white.

Inasmuch as there is to be no illusion of linear movement the pictures 36 are not displaced as in Fig. 1. It is to be noted, however, that the core size beginning with picture 28 increases. The graduated edges of the three pictures 36 are substantially of the same width. The difference in core sizes does not exceed the smallest width of the graduated edge.

Projection is identical with that explained in connection with Fig. 1, whether with two projectors, or by photographing the pictures upon a motion picture film and then projecting as explained in connection with Fig. 1.

Up to this point I have described my invention in detail in connection with pictures in black and white. It is to be understood that the effects of motion and variations in size can be produced in the same fashion where colors are employed. Thus the pictures 10 of Fig. 1 and pictures 36 of Fig. 2 may have a colored core and tinted graduated edges, the pictures in Fig. 1 being identical except for their relative displacement, while the pictures of Fig. 2 are identical except for differences in core size.

However, I desire to produce a change in color while projecting with or without apparent motion and with or without any change in size, that is, with or without contraction or expansion.

Figure 3:
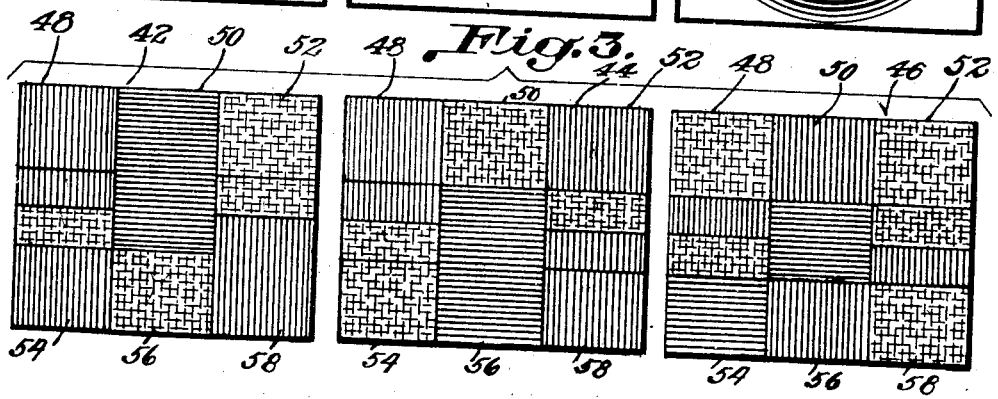
Fig. 3 illustrates pictures for producing color changes.

Referring now to Fig. 3: I have attempted to illustrate in this figure correlated pictures in color, so arranged that upon projection changes in color in prismatic sequence will be produced, both in progression and inversion.

The upper part of picture 42 of this series is made up of portions or elements 48, 50 and 52, in red, blue and yellow, respectively. The corresponding part of picture 44 is composed of portions or elements 48, 50 and 52, but the color order is changed to blue, yellow and red. The corresponding part of picture 46 is composed of portions or elements 48, 50 and 52, but the color order is again changed to yellow, red and blue. In other words, portion 48 in picture 42 is red, blue in picture 44, yellow in picture 46. The colors of 50 and 52 are likewise changed—prismatic progression.

The lower part of each picture has been illustrated as composed of three elements 54, 56 and 58. In picture 42 these are colored red, yellow and blue, respectively; in picture 44, yellow, blue and red, respectively; in picture 46, blue, red and yellow, respectively—prismatic inversion.

The center of the pictures 42, 44 and 46 has been shown as composed of different colored elements, but the arrangement of colors is the same in all three pictures.

Assuming now that pictures 42, 44 and 46 are projected as lantern slides in the manner described in connection with Fig. 1: It will be quite apparent that portion 48 will gradually change from red to violet to blue to green to yellow; portion 50 from blue to green to yellow to orange to red; and portion 52 from yellow to orange to red to violet to blue. The central part of the pictures will remain unchanged. The element 54 at the lower part of the pictures changes from red to orange to yellow, green to blue; element 56 from yellow to green to blue to violet to red; element 58 from blue to violet to red to orange to yellow. In other words, I obtain prismatic progression at the upper part of the picture and prismatic inversion in the lower part of the picture.

It is to be understood that these are mere examples of the possibilities of my invention so far as color changes are concerned and are not to be construed as limitations.

It is to be understood also that where it is desired to project by the use of a motion picture film the pictures 42, 44 and 46 are photographed upon a film precisely as explained in connection with Figs. 1 and 2.

Those skilled in the art will appreciate, furthermore, that the elements 48, 50 and 52 as well as 54, 56 and 58 may appear to move and/or to increase and diminish in size as well as change color simply by combining the procedures set out in connection with Figs. 1, 2 and 3.

It is to be understood that changes may be made in the details of procedure above described within the purview of my invention.

What I claim is:

1. The method of projecting, which method comprises the projection of light through a plurality of colored pictures while decreasing the intensity of the light rays passing through one picture and simultaneously increasing the intensity of the light rays passing through the other picture, the colors of the various elements of one picture varying in prismatic sequence from the colors of the succeeding pictures.

2. The method of projecting, which method comprises the projection of light through paired colored pictures successively, while gradually decreasing the intensity of the light rays passing through one picture of a pair as the intensity of the light rays passing through the other picture of a pair is increased, the colors of the various elements of each picture being arranged in prismatic sequence with respect to the colors of the various elements of the following pictures, whereby the illusion of gradual changes in color in prismatic sequences is produced.

3. The method of projecting, which method comprises projecting light rays through a traveling support carrying successive pairs of superimposed colored pictures, one picture of a pair decreasing in density in the direction of the travel of the support, the other picture of the same pair increasing in density in the same direction, the next succeeding pair of pictures varying in density in the reverse order, the colors of the various elements of one pair of pictures varying in prismatic sequence from the colors of the succeeding pair of pictures.

4. The method of projecting, which method comprises the projection of light simultaneously through a plurality of pictures, each picture comprising a core and a graduated edge, the inner part of each edge blending into the core, the outer part blending into a background, the core of one picture being larger than the core of the associated picture, the graduated edge of one picture being approximately of the same width as the graduated edge of the associated picture, the difference in diameter of the cores not exceeding the smallest width of the graduated edge, and on projection simultaneously gradually decreasing the intensity of the light rays passing through one picture while increasing the intensity of the light rays passing through the other picture, the pictures being displaced relatively to each other but to an extent not to exceed the width of the graduated edge in the direction of displacement, thereby to produce the illusion of motion.

5. The method of projecting, which method comprises the projection of light simultaneously through a plurality of pictures, each picture comprising a core and a graduated edge, the inner part of each edge blending into the core, the outer part blending into a background, the core of one picture being larger than the core of the associated picture, the graduated edge of one picture being approximately of the same width as the graduated edge of the associated picture, the difference in diameter of the cores not exceeding the smallest width of the graduated edge, and on projection simultaneously gradually decreasing the intensity of the light rays passing through one picture while increasing the intensity of the light rays passing through the other picture, the pictures being displaced relatively to each other but to an extent not to exceed the width of the core in the direction of displacement, thereby to produce the illusion of motion.

6. The method of projecting, which method comprises the projection of light simultaneously through a plurality of colored pictures, each picture comprising a core and a graduated edge, the inner part of each edge blending into the core, the outer part blending into a background, the core of one picture being larger than the core of the associated picture, the graduated edge of one picture being approximately of the same width as the graduated edge of the associated picture, the difference in diameters of the cores not exceeding the smallest width of the graduated edge, and on projection simultaneously gradually decreasing the intensity of the light rays passing through one picture while increasing the intensity of the light rays passing through the other picture, the pictures being displaced relatively to each other but to an extent not to exceed the width of the graduated edge in the direction of displacement, thereby to produce the illusion of motion.

7. The method of projecting, which method comprises the projection of light simultaneously through a plurality of colored pictures, each picture comprising a core and a graduated edge, the inner part of each edge blending into the core, the outer part blending into a background, the core of one picture being larger than the core of the associated picture, the graduated edge of one picture being approximately of the same width as the graduated edge of the associated picture, the difference in diameters of the cores not exceeding the smallest width of the graduated edge, and on projection simultaneously gradually decreasing the intensity of the light rays passing through one picture while increasing the intensity of the light rays passing through the other picture, the pictures being displaced relatively to each other but to an extent not to exceed the width of the core in the direction of displacement, thereby to produce the illusion of motion.

8. The method of projection, which method comprises the projection of light simultaneously through a plurality of pictures, each picture comprising a core and a graduated edge, the inner part of each edge blending into the core, the outer part blending into a background, the core of one picture being larger than the core of the associated picture, the graduated edge of one picture being approximately of the same width as the graduated edge of the associated picture, the difference in diameter of the cores not exceeding the smallest width of the graduated edge, and on projection simultaneously gradually decreasing the intensity of the light rays passing through one picture, while increasing the intensity of the light rays passing through the other picture, thereby to produce the illusion of contraction and expansion.

9. The method of projecting, which method comprises the projection of light simultaneously through a plurality of colored pictures, each picture comprising a core and a graduated edge, the inner part of each edge blending into the core, the outer part blending into a background, the core of one picture being larger than the core of the associated picture, the graduated edge of one picture being approximately of the same width as the graduated edge of the associated picture, the difference in diameter of the cores not exceeding the smallest width of the graduated edge, and on projection simultaneously gradually increasing the intensity of the light rays passing through one picture while decreasing the intensity of the light rays passing through the other picture, thereby to produce the illusion of contraction and expansion.

FERDINAND EARLE.